US012659432B1

(12) United States Patent
Allen

(10) Patent No.: US 12,659,432 B1
(45) Date of Patent: Jun. 16, 2026

(54) WEARABLE SECURITY DEVICE

(71) Applicant: Amazon Technologies, Inc., Seattle, WA (US)

(72) Inventor: Dan Gilbert Allen, Springville, UT (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 213 days.

(21) Appl. No.: 18/371,922

(22) Filed: Sep. 22, 2023

(51) Int. Cl.
| | |
|---|---|
| *H04N 7/18* | (2006.01) |
| *G06V 10/764* | (2022.01) |
| *G06V 20/40* | (2022.01) |
| *G06V 20/52* | (2022.01) |
| *G08B 7/00* | (2006.01) |
| *H04N 23/61* | (2023.01) |
| *H04N 23/667* | (2023.01) |

(52) U.S. Cl.
CPC ........... *H04N 7/188* (2013.01); *G06V 10/764* (2022.01); *G06V 20/41* (2022.01); *G06V 20/52* (2022.01); *H04N 7/183* (2013.01); *H04N 23/61* (2023.01); *H04N 23/667* (2023.01); *G08B 7/00* (2013.01)

(58) Field of Classification Search
CPC ........ G08B 7/00; G06V 10/764; G06V 10/52; H04N 7/188; H04N 23/183; H04N 23/61; H04N 23/667
USPC ........................................................ 348/158
See application file for complete search history.

(56) References Cited

U.S. PATENT DOCUMENTS

| | | | | |
|---|---|---|---|---|
| 7,088,387 B1 * | 8/2006 | Freeman | ................ | H04N 5/772 |
| | | | | 386/E5.072 |
| 9,922,537 B2 * | 3/2018 | Shah | ......................... | F41H 9/10 |
| 2018/0165933 A1 * | 6/2018 | Siminoff | ................ | H04N 23/51 |
| 2018/0262055 A1 * | 9/2018 | Schoenbart | .............. | H04B 5/79 |
| 2021/0081749 A1 * | 3/2021 | Claire | .................... | G06F 3/005 |
| 2021/0319894 A1 * | 10/2021 | Sobol | ..................... | G16H 20/30 |
| 2023/0199464 A1 * | 6/2023 | Baldree | .................. | H04B 1/385 |
| | | | | 455/404.1 |
| 2023/0242031 A1 * | 8/2023 | Jackson | ................. | B60N 3/001 |
| | | | | 296/163 |

FOREIGN PATENT DOCUMENTS

WO     WO-2024163178 A1 *   8/2024   ............. H04N 7/188

* cited by examiner

*Primary Examiner* — William C Vaughn, Jr.
*Assistant Examiner* — Astewaye Gettu Zewede
(74) *Attorney, Agent, or Firm* — K&L Gates LLP

(57)     ABSTRACT

Devices and techniques are generally described for wearable, battery-powered security devices. In some examples, a first classifier and first data generated by an accelerometer of a wearable, battery-powered security device may determine that the first data corresponds to human movement. In various examples, the wearable, battery-powered security device may be controlled to operate in a first operation mode based on the determining that the first data corresponds to human movement. In various examples, a camera of the wearable, battery-powered security device may capture and store video in a rolling buffer during operation of the wearable, battery-powered security device in the first operation mode.

21 Claims, 6 Drawing Sheets

300

```
Determining, using a classifier and first data generated by
an accelerometer of an electronic device, that the first data
corresponds to human movement 310
```
↓
```
Controlling the electronic device to operate in a first
operation mode based on the first data corresponding to
human movement, wherein the camera captures and
stores video in a rolling buffer during operation in the first
operation mode 320
```
↓
```
Detecting, using a machine learning model, a first object-
of-interest in the video stored in the rolling buffer during
operation in the first operation mode 330
```
↓
```
Controlling the electronic device to operate in a second
operation mode based on the detection of the first object-
of-interest in the video captured during the first operation
mode, wherein the camera continuously captures and
stores video in storage during the second operation mode
340
```

300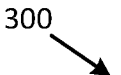

Determining, using a classifier and first data generated by an accelerometer of an electronic device, that the first data corresponds to human movement 310

Controlling the electronic device to operate in a first operation mode based on the first data corresponding to human movement, wherein the camera captures and stores video in a rolling buffer during operation in the first operation mode 320

Detecting, using a machine learning model, a first object-of-interest in the video stored in the rolling buffer during operation in the first operation mode 330

Controlling the electronic device to operate in a second operation mode based on the detection of the first object-of-interest in the video captured during the first operation mode, wherein the camera continuously captures and stores video in storage during the second operation mode 340

FIG. 3

WEARABLE SECURITY DEVICE

BACKGROUND

Various devices include sensors that may generate data representing represent some aspect of the environment in which the device is situated. For example, devices may include microphones and/or audio circuitry to capture sounds, cameras to capture image data, accelerometers to capture device acceleration, etc.

BRIEF DESCRIPTION OF DRAWINGS

FIG. 3 is an example flow chart depicting an example process for operation of a wearable electronic security device, in accordance with various aspects of the present disclosure.

DETAILED DESCRIPTION

Figure 1:
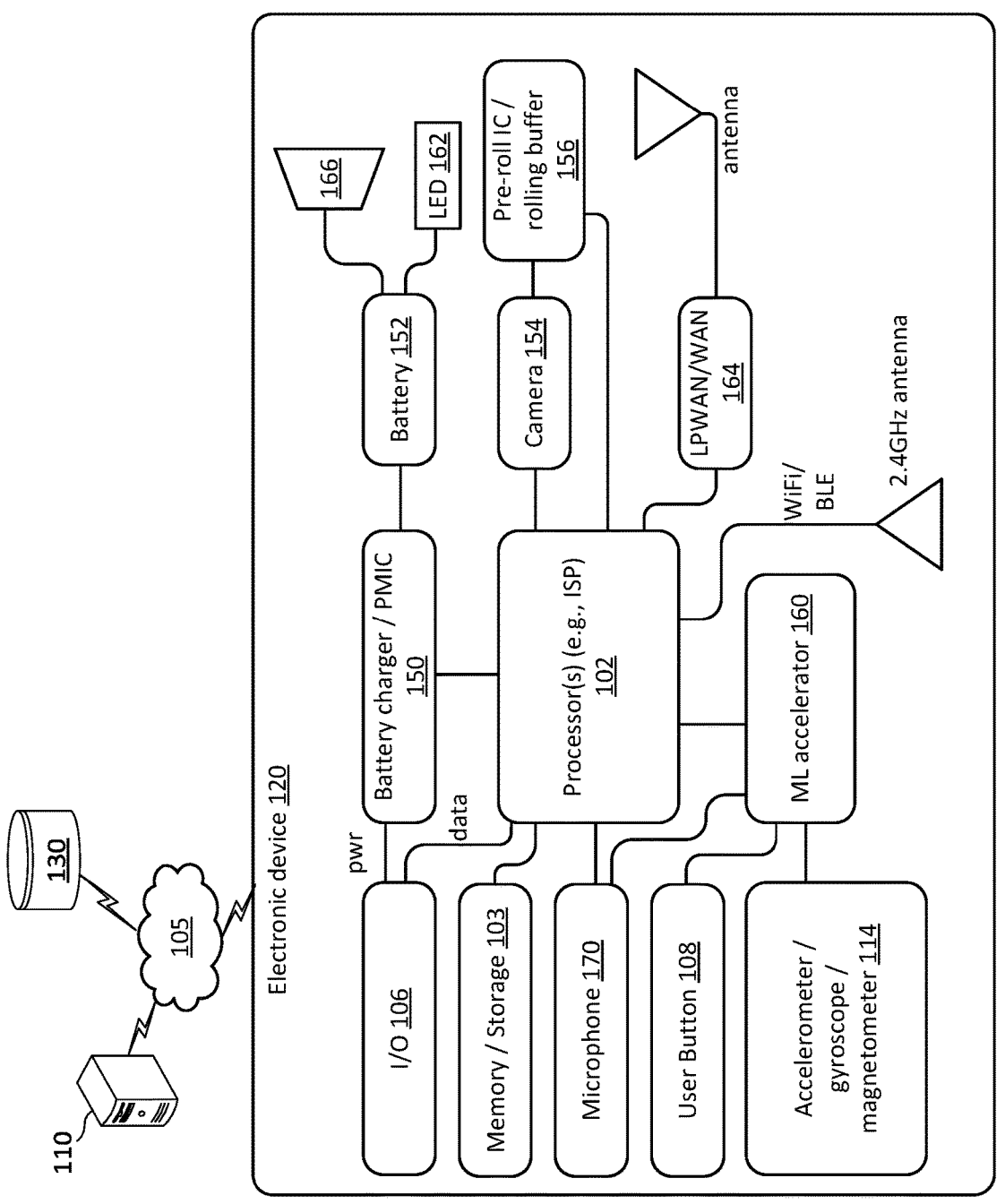
FIG. 1 is a block diagram of a wearable electronic security device, in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Body camera devices may be wearable electronic devices that may include cameras and/or other sensors effective to record video and audio of the wearer's surroundings. Body camera devices are sometimes used by police and/or security officers to capture activity and interactions that take place while the officer is on duty. Such body cameras are typically powered by relatively large battery packs so that the body cameras are able to continuously record video in order to capture video of activity/interactions throughout the officer's work shift. More generally, personal security devices may include sensors that may monitor a user's environment. In some examples, sensors included personal security devices may include one or more cameras, microphones and/or audio circuitry, accelerometers, etc.

Described herein are low-power wearable electronic security devices that may be used to provide personal security to a wearer or other user. In various examples, the wearable electronic security devices described herein may include privacy features to prevent unauthorized and/or secret uses of the electronic security devices. For example, the wearable electronic devices may transition between various operating states that may be used to limit power consumption and which may enhance privacy and/or security. For example, during operation in an idle state (e.g., an idle operation mode), no video and/or audio may be recorded. During operation in a pre-roll state (e.g., a pre-roll operation mode), video and/or audio may be captured and stored in a limited duration rolling buffer. A rolling buffer (sometimes referred to as a "circular buffer" or a "ring buffer") may be a computer-readable memory that may store a finite duration of continuous video and/or audio (e.g., 10 seconds or some other desired duration). After 10 seconds of continuous video and/or audio have been stored in the rolling buffer, newly-recorded audio and/or video may overwrite the oldest video/audio such that the content of the rolling buffer at a given time represents the most recent 10 seconds (or other duration) of video/audio recorded. In various examples, the video and/or audio recorded during pre-roll operation may be of a relatively low quality (e.g., 0.25 full resolution and/or at a relatively low frame rate) in order to conserve battery life of the wearable electronic security device.

In various examples, either manual interaction (e.g., detection of a button press) and/or detection of an event of interest (e.g., detection of a human face in the pre-roll video, detection of a sound of interest in recorded audio (e.g., a scream, glass-breaking, a panic word, etc.)) the wearable electronic security device may transition from the pre-roll mode to a continuously recording mode in which audio and/or video are continuously recorded (e.g., at full resolution and/or frame rate) and stored in persistent memory on the wearable electronic security device.

For example, a user may be on a jog and may wear the wearable electronic security device on a strap of their clothing, on a headband, a wristband, a belt, pinned to their shirt, and/or on an article of clothing, generally. The user may press a button on the device to operate the device in the pre-roll operation mode. Thereafter, if the user becomes panicked (e.g., due to an approaching stranger or animal) or otherwise wants to record continuous video, the user may press the button (e.g., a short press) to transition the wearable electronic security device to the continuously-recording operation mode. In some other examples, instead of pressing a button to transition the wearable electronic security device from the pre-roll operation mode to the continuously-recording operation mode, computer vision and/or audio-event detection processing may be used to automatically detect potential events of interest (e.g., a human face, a dog, a particular sound (such as a predefined panic word or other voice command)). Detection of such pre-defined events may be configured to cause the wearable electronic security device to transition from the pre-roll mode of operation to the continuously-recording operation mode (without requiring a button press). The wearable electronic security device may be configured (e.g., using a companion application and/or an interface of the device) to transition between the pre-roll operation mode and the continuously-recording operation mode using predefined detection events and/or manual button presses, as desired.

In some examples, during operation in the continuously-recording mode and/or in the pre-roll operation mode a rapid button press or a predefined panic word may be used to transition the wearable electronic security device into a panic mode of operation. In the panic mode audio and/or video may be continuously recorded into persistent memory of the wearable electronic security device. In addition, during panic mode operation, the wearable electronic security device may emit a siren (or other audible alarm) and/or a flashing light. A long press and/or voice command may be used to transition the wearable electronic security device from the panic mode back to the pre-roll operation mode (e.g., after a security event has ended).

In various examples, an accelerometer and/or other motion sensing elements (e.g., a gyroscope, a magnetometer, etc.) may be used to generate acceleration data (and/or other motion data depending on the type of sensor(s) being used). A classifier (e.g., a machine learning model such as a neural network, a multi-layer perceptron, etc.) may classify acceleration data and/or other motion data as corresponding to human motion (e.g., walking, running, bicycling, swimming, yoga, etc.) or non-human motion (e.g., vehicle motion). Detection of inactivity (no motion) and/or non-human motion may be used to transition the operating mode of the wearable electronic device to different states. For example, during operation in pre-roll operation mode, a detection of inactivity (e.g., no motion or no human motion) for a time period exceeding a threshold amount of time (e.g., 2 minutes, 5 minutes, etc.) may cause the wearable electronic security device to transition from the pre-roll operation mode to the idle mode. Such a timeout may serve multiple purposes. First, termination of recording when no device motion (or no motion that may be associated with human exercise) is detected may conserve battery life. Second, termination of video recording and/or audio recording may prevent the wearable electronic security device from being used as an unauthorized "spy cam" as the device will cease capturing video and/or audio upon the detection of inactivity/non-human motion.

Similarly, while operating in continuously-recording operation mode, a detection of inactivity and/or non-human motion (e.g., for a predefined period of time) may cause the wearable electronic security device to transition from the continuously-recording operation mode to the pre-roll operation mode. Again, this may conserve power and prevent unauthorized usage of the wearable electronic security device to record unwitting persons/events. Additionally, during operation in the continuously-recording mode, a button press (e.g., a short button press) may be used to transition the wearable electronic security device to the pre-roll operation mode.

In various examples, during operation of the wearable electronic security device in the continuously-recording operation mode and/or the panic operation mode, the wearable electronic security device may use a low power wireless interface (e.g., a low power personal area network (LPPAN) or a low power wireless area network (LPWAN) (such as Bluetooth low energy (BTLE), Zigbee, etc.) to transmit alerts, snapshot images (e.g., image data of a face detection, human detection, animal detection, and/or other event in the video related to the state transition from pre-roll operation mode to continuously-recording operation mode), audio (e.g., an audio file representing a detected audio event of interest (e.g., a scream, voice alert, voice command, etc.) to a pre-defined set of other computing devices. For example, such alerts, snapshots, and/or audio files may be sent to a mobile device associated with the wearable electronic security device, to other associated devices (e.g., to devices associated with a pre-defined set of users in the companion application of the wearable electronic security device). For example, the user of the wearable electronic security device may have an account registered for the wearable electronic security device. The user account may have a number of "friend" accounts and/or other accounts that are designated (e.g., via a companion application) to receive alerts transmitted by the wearable electronic security device. Accordingly, such alerts, snapshots, and/or audio files may be sent using the low power wireless interface of the wearable electronic security device to the predefined set of devices. In various cases, depending on the relevant security event generating the event, the users of these other devices may contact the police and/or otherwise seek to provide assistance to the wearer of the wearable electronic security device. In some other examples, such alerts, snapshots, and/or audio files may be directly sent to law enforcement and/or a security monitoring team or service.

Machine learning techniques, such as those described herein, are often used to form predictions, solve problems, recognize objects in image data, classify movement data (as in the various examples described herein), etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

To train a machine learning model, a cost or "loss" function may be utilized that describes the difference between expected output of the machine learning model and actual output. Parameters (e.g., weights and/or biases) of a machine learning model may be updated based on annotated training data to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

A video may be represented by a number of video frames that may be displayed in sequence during playback, with each video frame being comprised of rows and columns of pixels arranged in a two-dimensional grid. The resolution of a particular video frame is described by the width of the frame, in terms of a first number of pixels, by the height of the frame, in terms of a second number of pixels. Video frames may be compressed using different picture types or frame types, such as intra-coded pictures or frames, predicted pictures or frames, and/or bi-predictive pictures or frames. Generally, the term "frame" is used to refer to an entire image captured during a time interval (e.g., all rows and columns of pixels comprising a particular image). Generally, the term "field" is used to refer to part of a frame, e.g. either the odd-numbered or even-numbered scanning lines of the frame. Generally, the term "picture" is used to refer to either a frame or a field. For simplicity, in some cases, various techniques described herein may be described in reference to "frames" or "pictures" even though actual operations may be performed on pixels and/or groups of pixels (e.g., on frame data or picture data).

It will be appreciated that, generally, the amount of data required to represent a video frame and the amount of power consumed during encoding will increase as the resolution of the video frame increases (given a relatively constant frame rate), and as the frame rate increases (given a relatively constant resolution).

Figure 6:
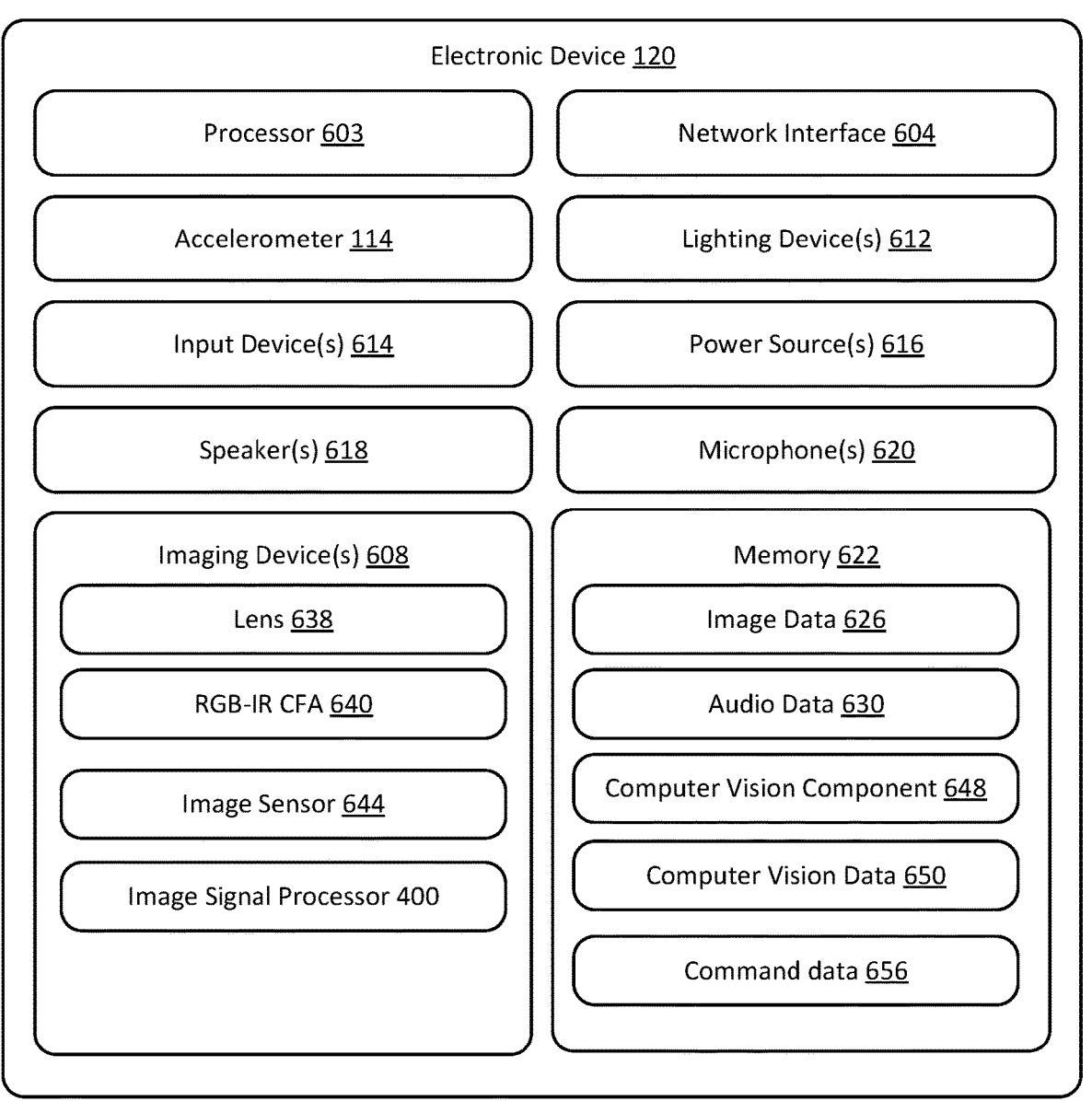
FIG. 6 is another example block diagram illustrating example components that may be included in a wearable electronic security device, in accordance with various aspects of the present disclosure.

FIG. 1 is a block diagram of an example electronic device 120 that may be used in accordance with the various examples described herein. It should be noted that not all examples of electronic device 120 will include all of the components of the architecture shown in FIG. 1. Additionally, some electronic devices 120 may include additional components not shown in the architecture of FIG. 1. For example, FIG. 6 depicts additional components that may be included in at least some instantiations of the electronic device 120. In some examples, the electronic device 120 may have a small form factor such that it may be worn on a user's clothing. Accordingly, in some examples, the electronic device 120 may be a wearable electronic security device. However, there is no requirement that the electronic device 120 is wearable. In some other examples, the electronic device 120 may be handheld. Although the electronic device 120 is shown with various components, it should be noted that other and/or different components apart from those specifically shown may be included in a device that may be used in accordance with the various examples described herein.

In the example in FIG. 1, electronic device 120 may include one or more processors 102 and one or more non-transitory computer-readable memories 103 (and/or storage). The one or more processors 102 may include, for example, an image signal processor (ISP), such as the ISP architecture shown in FIG. 4. The one or more processors may be used to execute instructions and/or retrieve data stored in the memory/storage 103. In some examples, the processors 102 may include one or more digital signal processors (DSPs).

In accordance with one or more implementations, an electronic device may include a plurality of different processors capable of operating at different power levels. In accordance with one or more implementations, an electronic device may include a plurality of different processors or systems on a chip (SoCs) configured to provide specific functionality, e.g. a video or media processor or SoC, an audio processor or SoC, a Bluetooth processor or SoC, a Wifi processor or SoC, a sub-GHz processor or SoC, an accelerometer processor or SoC, etc. In accordance with one or more implementations, one or more of these SoCs may be configured to implement or utilize a machine learning model, e.g. include a neural network accelerator and/or digital signal processor.

The non-transitory computer-readable memories 103 may store instructions that, when executed by the one or more processors 102, may enable the electronic device 120 to perform various functionality, including decision logic to determine whether to transition between various operation modes described herein. The memory/storage 103 may include one or more different types of memory, data storage, and/or computer-readable storage media devoted to different purposes within electronic device 120. For example, the memory/storage 103 may comprise flash memory, random-access memory, disk-based storage, etc. Different portions of the memory/storage 103 may be used for program instructions for execution by the processors 102, storage of images and/or audio data, and/or a removable storage (e.g., a Secure Digital card (an SD card) for transferring data to other devices, etc. The memory/storage 103 may also store software for execution by the processors 102.

In various examples, the electronic device 120 may include one or more input/output (I/O) components 106. The I/O components 106 may include one or more buttons, touch screen displays, switches, etc., used to interact with and/or control functionality of the electronic device 120, as described in further detail below. In various examples, the I/O components 106 may include an interface (e.g., a USB-C interface) that may be used to connect another device to download video and/or audio data stored by the electronic device 120. In various examples, the user button 108 may be a distinct component from the I/O components 106. However, in other examples, the user button 108 may be an example of an I/O component 106.

The electronic device 120 may include a battery charger and/or power management integrated circuit (PMIC) coupled to a battery 152. The battery may be, for example, a 400 mA-hr Lithium ion battery and/or another rechargeable battery. The battery 152 may supply power to the various other components of the electronic device 120 during operation. For example, during panic mode operation, the battery 152 may be used to provide power to a light emitting diode (LED) 162 (to cause the LED 162 to flash during panic mode operation) and/or to drive a loudspeaker 166 (e.g., to emit an alarm sound and/or siren during panic mode operation). Additionally, the LED 162 may be controlled to flash periodically during pre-roll operation mode and/or continuously-recording operation mode to alert persons to the presence of the electronic device 120 (for privacy and security reasons).

In various examples, the electronic device 120 may communicate with one or more remote computing devices 110 over a network 105. Network 105 may be, for example, a wide area network (a WAN, such as the Internet), a local area network (LAN), a LPWAN, an LPPAN, or some combination thereof. In various examples, electronic device 120 may include various types of wireless transmitters/receivers or transceivers that may be effective to send and receive wireless radio signals. Accordingly, in at least some examples, data may be transmitted wirelessly between electronic device 120 and remote computing device 110, over network 105, using such wireless transmitters. For example, the electronic device 120 may include a WiFi transmitter and/or a Bluetooth Low Energy (BLE) radio and a corresponding 2.4 GHz antenna, as shown in FIG. 1. In other examples, the electronic device 120 may include an LPWAN radio 164 and a corresponding low power antenna, e.g. a sub-GHz radio and antenna. In other examples, the electronic device 120 may include a wireless area network (WAN) radio and one or more antennas (e.g. a primary antenna and one or more diversity antennas), e.g. a Long-Term Evolution (LTE) radio and/or other cellular technology radio (5G, etc.) Typically, unless connected to mains power, the electronic device 120 may be a battery-powered electronic device that may be too power constrained to stream video and/or audio to remote computing devices 110 on a continuous or semi-continuous basis. However, as described in further detail below, in some instances, the electronic device 120 may send snapshots (e.g., frames of image data) and/or audio snippets (short audio files) to one or more remote computing devices 110 upon detection of a potential security event using a low power transmission interface.

In various examples, remote computing device(s) 110 and/or electronic device 120 may be configured in communication (e.g., over network 105) with additional non-transitory computer-readable media 130. In an example, the additional non-transitory computer-readable media 130 may be distributed storage that may be accessible by the electronic device 120 and/or the remote computing device(s) 110 over network 105. In other examples, the additional non-transitory computer-readable media 130 may be at least partially integrated into one or more of electronic device 120 and/or the remote computing device(s) 110.

One or more of an accelerometer, gyroscope, and/or magnetometer (component(s) 114) may be included in the electronic device 120. An accelerometer may be used to measure acceleration, which is the rate of change in the velocity of the electronic device 120. The accelerometer may be used to detect the orientation of the electronic device 120 relative to the Earth's gravity, as well as to detect motion and/or vibration. As described in further detail below, the acceleration data provided by the accelerometer may be used to determine the type of movement experienced by the electronic device 120. For example, the acceleration data may be determined to correspond to one or more predefined motion profiles that may be characteristic of different types of motion. For example, accelerometer data may be used to distinguish between a running person and a walking person based on the correspondence of the accelerometer data to the motion profile of a running person or the motion profile of a walking person. In another example, the accelerometer data may be used to distinguish between bipedal movement (e.g., human movement) and quadruped movement (e.g., cat, dog, goat, movement). In various further examples, the accelerometer data may be used to distinguish between human movement (e.g., walking, running, bicycling, exercising, swimming, etc.) and non-human movement (e.g., vehicle movement and/or placing the electronic device 120 on a moving surface and/or a vehicle).

Gyroscopes measure angular velocity, which is the rate of change of an object's orientation. Gyroscopes may be used to detect rotation and/or changes in orientation of the electronic device 120. Magnetometers measure the strength and direction of magnetic fields and can be used as a compass to determine the direction a device is oriented (e.g., facing). In combination, an accelerometer, gyroscope, and magnetometer can provide a rich set of data about the electronic device 120's orientation, movement, and/or surroundings.

In an example implementation in which the electronic device 120 is a wearable electronic security device, the machine learning accelerator 160 (e.g., a graphics processing unit (GPU), tensor processing unit (TPU), neural network accelerator (NNA), etc.) may be used to execute, at least in part, a supervised machine learning model that may be trained to predict whether motion data corresponds to characteristic human motion (or non-human motion—including inactivity). The machine learning model may be, for example, a multilayer perceptron, a neural network, a convolutional neural network, a transformer-based model, etc. The machine learning model may be trained using training data that pairs movement information (e.g., accelerometer data) with ground truth labels that classify the particular movement information as pertaining to a particular class (e.g., quadruped movement, biped movement, dog movement, cat movement, human movement, automobile movement, bicycle movement, and/or any other class that may be of interest according to the desired implementation). Uses of the accelerometer/gyroscope/magnetometer 114 data during operation of the electronic device 120 are described in further detail below in reference to FIG. 2.

Camera 154 may include an image sensor (e.g., a complementary metal oxide semiconductor (CMOS) image senor and/or a charge-coupled device (CCD) image sensor) and may be effective to capture video through a lens (not shown) of the electronic device 120. The camera 154 may be communicatively coupled to a pre-roll integrated circuit/ rolling buffer 156. As previously described, the rolling buffer 156 may be memory effective to store a particular amount of data and/or duration of video data (at a given resolution and/or frame rate). During pre-roll operation mode, once the rolling buffer is full, newly-captured video data may be used to overwrite the oldest video data stored in the rolling buffer 156 such that the contents of the rolling buffer 156 represent the most-recently captured video. In various examples, the electronic device 120 may monitor audio only and may not include a camera 154. Additionally, in some other examples, memory/storage 103 of the electronic device 120 may store a code that may be broadcast by one or more of the wireless interfaces of the electronic device 120 in order to actuate (e.g., unlock or lock) a smart lock (e.g., a network-enabled device such as an Internet-of-things-enabled smart lock of a home and/or a vehicle).

The ML accelerator 160 (and/or another component) may execute one or more computer vision models (e.g., CNNs, vision transformers, etc.) to detect predefined objects of interest (e.g., human detections, face detections, etc.) in the video stored in the rolling buffer 156 during pre-roll operation mode. Detection of such events may cause the electronic device 120 to transition to continuously-recording operation mode, in some examples. Similarly, in some examples, the ML accelerator (and/or another component) may execute an audio-event detection model that may detect one or more voice commands, panic words, and/or other audio events of interest (e.g., a scream, glass breaking, a barking dog, etc.) in audio captured using microphone 170 (and/or audio front end circuitry). Optionally, detection of such events may cause the electronic device 120 to transition to continuously-recording operation mode.

In various examples, the electronic device 120 may include a global navigation satellite system (GNSS) device, such as a Global Positioning System (GPS) device. In various examples described in further detail below, the electronic device 120 may send notifications to other users (e.g., users associated with the account holder of electronic device 120) during a panic mode and/or continuous video recording mode of electronic device 120 in order to inform other users that the wearer/user of the electronic device 120 may require assistance. In various examples, such notifications may include time and/or location data generated by the GNSS so that the other users may be aware of the time and location where an event occurred (in order to assist the user). In various further examples, the notifications may include snapshots (e.g., a frame of image data) representing an event-of-interest (e.g., a face detection event) and/or audio data (e.g., audio representing an audio event such as yelling, dog barking, etc.) to inform the other users of the event being experienced by the user of electronic device 120. In various examples, an LTE radio (e.g., the WAN of LPWAN/ WAN 164) may include a GPS component effective to determine GPS location data.

Electronic device 120 may include other components that are not specifically shown in FIG. 1. For example, the electronic device may include other privacy preserving features such as a camera cover, switch, and/or button that may cover the lens of the camera 154 and/or otherwise disable operation of camera 154 to prevent capture of image data. In some further examples, the microphone 170 may include a mute button to prevent the electronic device 120 from capturing audio.

Figure 2:
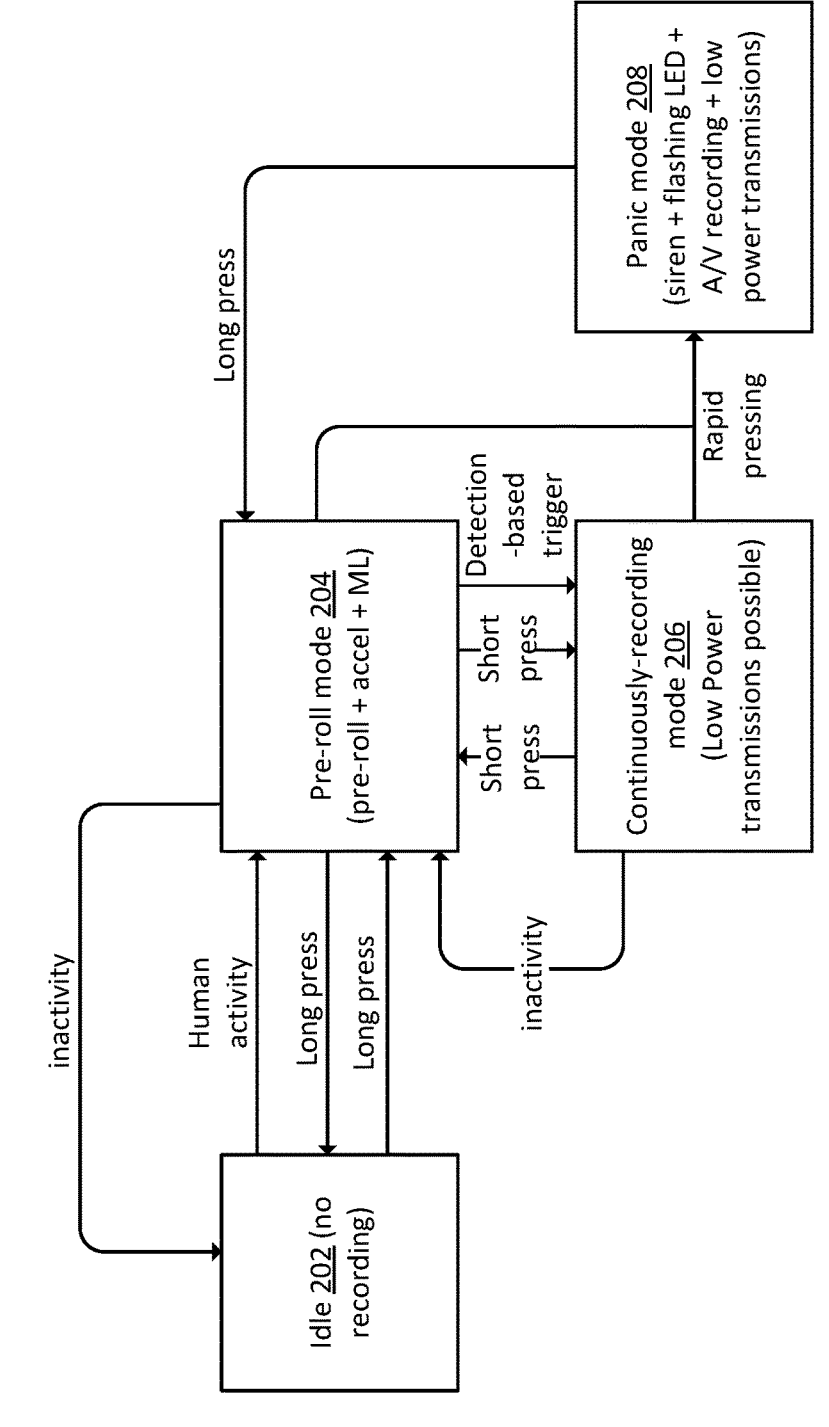
FIG. 2 is a state diagram illustrating example operation modes of a wearable electronic security device, in accordance with various aspects of the present disclosure.

FIG. 2 is a state diagram illustrating example operation modes of a wearable electronic security device (such as electronic device 120), in accordance with various aspects of the present disclosure. It should be noted that the operation of electronic device 120 may vary in some respects from the specific state diagram shown in FIG. 2, according to the desired implementation.

The electronic device 120 may default to an idle operation mode 202. During the idle operation mode 202 no recording of video or audio may be performed (in order to minimize power consumption and conserve battery life and in order to prevent unauthorized recording). A user of the electronic device 120 may initiate pre-roll operation mode 204 using a press of the button (e.g., a long press of user button 108) and/or a voice command. In some examples, accelerometer data may be evaluated during operation in idle mode 202 (e.g. using a machine learning model). Optionally, if the accelerometer data indicates human activity (e.g., human exercise motion), processing may transition from idle operation mode 202 to pre-roll operation mode 204. This may conveniently re-enable pre-roll operation mode 204 during periods of human activity. For example, the user may pause a jog to take a phone call. During the phone call the user may be seated or otherwise immobile causing the electronic device 120 to timeout and transition from pre-roll operation mode 204 to idle operation mode 202. Once the user's phone call ends and the user resumes their jog, the accelerometer data may again be used to detect human activity and the electronic device 120 may be transitioned from the idle operation mode 202 to the pre-roll operation mode 204.

In pre-roll operation mode 204, the camera and/or microphone of the electronic device 120 may be activated to record video and/or audio into the rolling buffer 156. For example, during pre-roll operation mode 204, the camera and/or microphone may record 10 seconds (or some other duration) of audio and/or video with the most recent audio/video being used to overwrite the oldest audio/video in the rolling buffer 156. Accordingly, during pre-roll operation mode 204, the rolling buffer 156 may store the most recent 10 seconds (or other rolling buffer duration) of audio/video. As previously described, during pre-roll operation mode the audio and/or video recorded may be of less-than full quality. For example, the resolution and/or frame rate of the pre-roll video may be less than a full frame rate and/or resolution of the camera 154 (e.g., $\frac{1}{4}^{th}$ full resolution and/or frame rate) in order to reduce power consumption and conserve battery life.

During idle mode 202 and/or pre-roll operation mode 204 accelerometer data may be monitored and input into a machine learning classifier (e.g., a supervised neural network) trained to distinguish between human motion (e.g., walking, running, bicycling, skateboarding, etc.) and non-human motion (e.g., inactivity, vehicle motion, animal motion, etc.). In some examples, the ML accelerator 160 of FIG. 1 may be used to execute the model. Optionally, if human motion is detected, operation of the electronic device 120 may be transitioned from the idle operation mode 202 to the pre-roll operation mode 204 (and the camera and/or audio front end circuitry may be powered up). If inactivity or non-human motion is detected for greater than a threshold time period (e.g., ≥1 minute, 2 minutes, 5 minutes, etc.), operation of the electronic device 120 may be transitioned from the pre-roll operation mode 204 (or from another mode) to idle operation mode 202 (and the camera and/or audio front end circuitry may be powered down to conserve battery life). This may also be a security/privacy feature to prevent the electronic device 120 from being left at a location to record video and/or audio from that location (e.g., as an unauthorized spy cam). Additionally, in the example shown in FIG. 2, a long press of user button 108 may cause the electronic device 120 to transition from the pre-roll operation mode 204 to the idle operation mode 202. For example, after a user has completed their run and/or exercise, they may use a long press of the user button 108 to cause the electronic device 120 to transition from the pre-roll operation mode 204 to the idle operation mode 202 to conserve power.

Additionally, during pre-roll operation mode 204 the video data and/or audio data of the rolling buffer 156 may be processed using one or more computer vision-based object detector machine learning models and/or audio-event classification models to determine whether a pre-defined object has been detected in generated video (which has been or would be stored in the rolling buffer 156) and/or audio (which may be stored in a rolling buffer and may be stored in the same rolling buffer 156, or may be stored elsewhere or separately). For example, a CNN-based classifier and/or vision transformer may be used to detect human faces, dogs, humans, etc., in the video. The particular classes of objects that may be detected and/or used to trigger transition to continuously-recording operation mode 206 may be configured as desired (e.g., using a companion application). Similarly, a machine learning-based classifier (e.g., a CNN, transformer, or other model) may evaluate generated audio data to determine whether one or more predefined audio events have been detected (e.g., a predefined voice command ("record video", "I'm scared," etc.), a dog barking, a scream, etc.). Upon detection of an event of interest (e.g., a predefined object of interest in the video and/or a predefined audio event of interest in the audio), the electronic device 120 may transition from pre-roll operation mode 204 to the continuously-recording operation mode 206. Optionally, instead of using event detection to transition from pre-roll operation mode 204 to the continuously-recording operation mode 206, a button press (e.g., a short button press of user button 108) may be used to transition the electronic device 120 from pre-roll operation mode 204 to the continuously-recording operation mode 206. Configuration of the electronic device 120 may be performed using a companion application such that only certain video-detection and/or audio-detection events cause transition from pre-roll operation mode 204 to the continuously-recording operation mode 206 and/or to put the electronic device 120 in a manual-only mode wherein only a short button press or other manual input causes transition from pre-roll operation mode 204 to the continuously-recording operation mode 206.

Once in continuously-recording operation mode 206, the electronic device 120 may continuously record audio and/or video at full resolution/frame rate into persistent storage of memory/storage 103. Additionally, during continuously-recording operation mode 206 snapshots (e.g., frames of image data depicting detected objects-of-interest) and/or audio clips (e.g., audio samples representing audio events-of-interest) may be transmitted using a low power wireless transmission interface to one or more other electronic devices (e.g., devices associated with "friends" in the companion application, devices associated with a security monitoring service, devices associated with police and/or emergency responders, etc.). In some cases, text alerts may be sent that may or may not be accompanied by the snapshots and/or audio clips.

In the example shown in FIG. 2, a short press may be used in continuously-recording operation mode 206 to transition the operating state back to the pre-roll operation mode 204. Additionally, the accelerometer data may be processed during the continuously-recording operation mode 206 to determine whether or not there is human motion being detected. If no human motion is detected for greater than or equal to a threshold period of time (e.g., there is inactivity or non-human motion being detected indicating that the electronic device 120 has been set down or is otherwise not associated with interesting activity) the electronic device 120 may be transitioned from the continuously-recording operation mode 206 to the pre-roll operation mode 204.

In either the pre-roll operation mode 204 or the continuously-recording operation mode 206 rapid button pressing (e.g., of user button 108), specific pre-defined voice commands (e.g., "Panic mode"), and/or particular event detections (e.g., suspicious activity, a face up close to the camera, erratic motion, yelling, dog barking, sudden acceleration, the wearer falling, etc.) may be used to transition the electronic device 120 to the panic operation mode 208. Like in continuously-recording operation mode 206, full resolution/ frame rate video and/or audio may be recorded in panic operation mode 208. Additionally, snapshots, audio clips, and/or text alerts may be transmitted by the electronic device 120 in the panic operation mode 208 to alert other devices that the user may be in an emergency and/or to request that a recipient contact police and/or emergency services. Additionally, in panic operation mode 208 a siren and/or alarm may be emitted using the loudspeaker 166. Additionally, in some examples, a flashing light may be emitted by LED 162 in panic operation mode 208. The siren and/or light may alert others that the user in trouble and/or may deter would be thieves and/or attackers. In the example of FIG. 2, a long press of user button 108 may cause the operating mode of the electronic device 120 to transition from panic mode operation 208 to pre-roll operation mode 204.

It should be noted that while an electronic device 120 that includes a camera is generally described above, that other instantiations of an electronic device 120 may not include a camera and may only use audio recording and/or transmission during the various operation modes described above. Such an implementation may improve battery life.

As noted above, multiple devices may be employed in a single system. In such a multi-device system, each of the devices may include different components for performing different aspects of the system's processing. The multiple devices may include overlapping components. The components of the computing device(s), as described herein, are exemplary, and may be located as a stand-alone device or may be included, in whole or in part, as a component of a larger device or system.

FIG. 3 is flow chart describing an example process 300 for operation of a wearable electronic security device, in accordance with various aspects of the present disclosure. Those portions of FIG. 3 that have been previously discussed in reference to FIGS. 1-2 may not be described again for purposes of clarity and brevity. The actions of the process 300 may represent a series of instructions comprising computer-readable machine code executable by one or more processing units (e.g., CPUs, GPUs, tensor processors, etc.) of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the various techniques described herein.

Processing may begin at action 310, at which first data may be received from an accelerometer of the electronic device 120. The first data may be evaluated by a classifier (e.g., a machine learning model (e.g., a supervised classifier)) to determine that the first data corresponds to human movement. In an example, the electronic device may be in either idle operation mode 202 or pre-roll operation mode 204 when the human movement is detected.

Processing may continue at action 320, at which the electronic device 120 may be controlled to operate in a first operation mode (e.g., pre-roll operation mode 204) based on the first data corresponding to human movement. For example, if the electronic device 120 is in idle operation mode 202, detection of human movement may cause the electronic device 120 to transition to pre-roll operation mode 204. In another example, if the electronic device 120 is already operating in pre-roll operation mode 204, detection of human movement (without more) may cause the electronic device 120 to remain in the pre-roll operation mode 204. For example, this may reset an inactivity timeout timer that causes transition to idle operation mode 202 upon expiration. During the first operation mode (e.g., pre-roll operation mode 204) the camera may be controlled to capture and store video in the rolling buffer 156.

Processing may continue at action 330, at which a machine learning model may detect a first object of interest in the video stored (or to be stored) in the rolling buffer during operation in the first operation mode. For example, video stored (or to be stored) in the rolling buffer 156 may be periodically evaluated (e.g., every three frames of the video, every 10 frames, every 60 frames, every 120 frames, etc.) to determine whether one or more predefined objects-of-interest are detected. For example, detection of a human, a human face, a dog, etc., may cause the electronic device 120 to transition from the pre-roll operation mode 204 to the continuously-recording operation mode 206. Additionally, as previously described, a user of the electronic device 120 may trigger manual transition to the continuously-recording operation mode 206 using a short button press (or other manual input).

Processing may continue at action 340, at which the electronic device 120 may be controlled to operate in a second operation mode (e.g., continuously-recording operation mode 206) based on the detection of the first object of interest in the video captured during the first operation mode. In the second operation mode (e.g., continuously-recording operation mode 206) the camera may continuously record and store video (e.g., in full resolution and at full frame rate) in storage. Additionally, in some examples, the electronic device 120 may transmit snapshots (e.g., one or more frames depicting the detected object of interest causing the electronic device to transition to the continuously-recording operation mode 206) using a low power wireless interface to one or more remote devices together with alerts and/or push notifications.

In some examples, a notification or alert may be triggered during transition from the first operation mode (e.g., pre-roll operation mode 204) to the second operation mode (e.g., continuously-recording operation mode 206). This notification or alert may, for example, be sent to remote system that in turn processes it and sends a push notification to one or more user devices associated with an account associated the personal camera. A push notification may also be sent to other users (e.g., other accounts linked to the user's account) based on configuration settings. These push notifications may be sent via an app loaded on a user device, or via a text message or SMS service, etc. In various examples, the rich notification may include a snapshot which may be, for example, a first frame of video captured after transitioning to the continuously-recording operation mode 206 and/or panic mode 208 (after auto-exposure, white balancing, etc.).

In some other examples, a frame representing an event-of-interest (e.g., a face detection) and/or relevant frame may be selected using computer vision at the remote system and/or the personal camera device and sent as a snapshot with the rich notification. In further examples, the notification or alert sent to the remote system may include one or more time-stamps and/or location data (e.g., received from a Global navigation satellite system (GNSS) device, such as a Global Positioning System (GPS) device). In some examples, time or location information may also be sent in a rich notification to a user device so that other users may be aware of the time and location where the event occurred (in order to assist the user).

Figure 4:
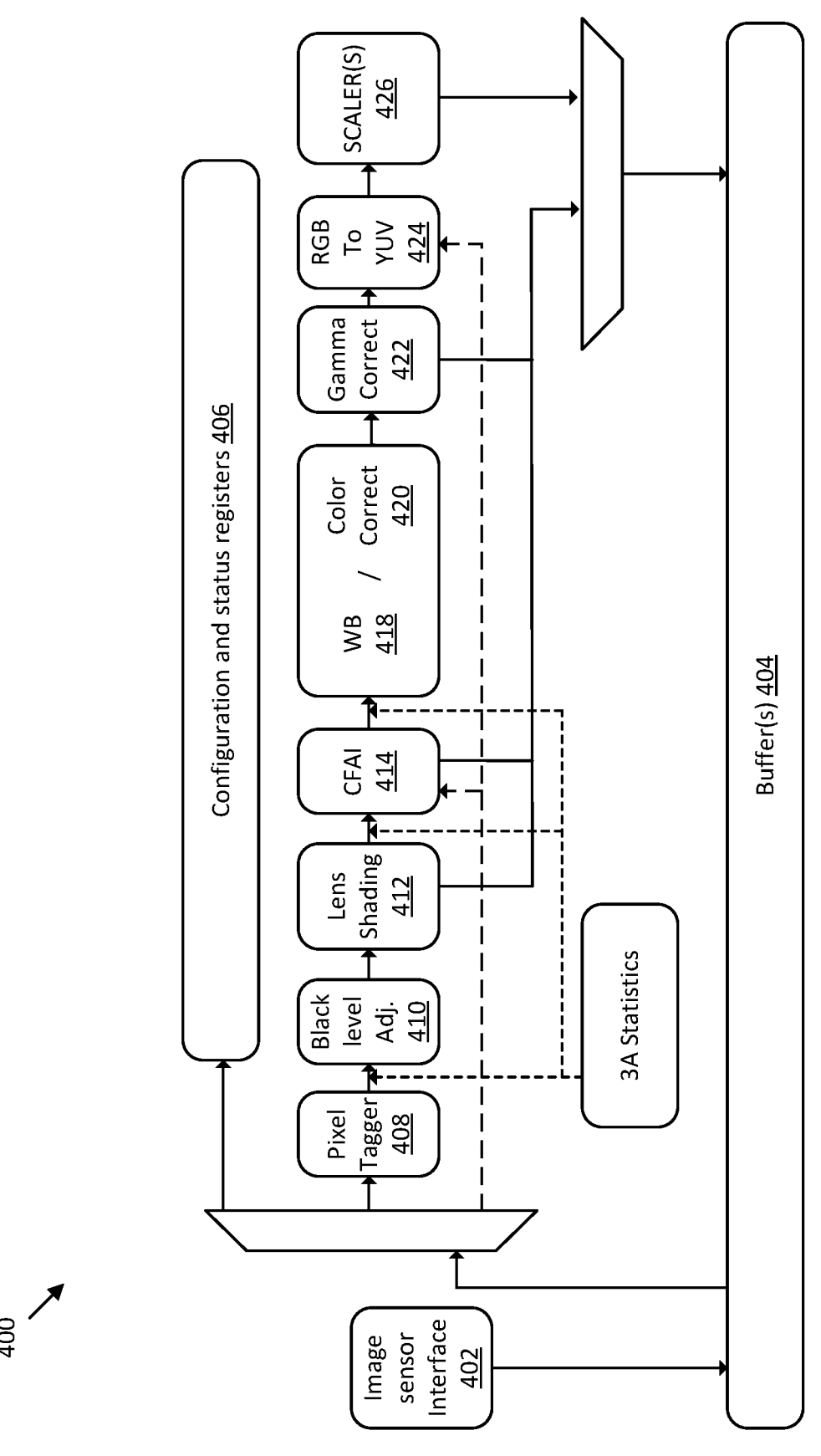
FIG. 4 depicts an example architecture of an image signal processor that may be used in various wearable electronic security devices, in accordance with various aspects of the present disclosure.

FIG. 4 is a block diagram of an example image signal processor architecture 400 that may be used in accordance with various aspects of the present disclosure. For example, electronic device 120 may include image signal processor architecture 400 among the one or more processors 102. In some examples, an image signal processor may be implemented with a different architecture relative to the example image signal processor architecture 400 displayed in FIG. 4. For example, certain components may be omitted, additional components may be added, and/or some components may be substituted for other, different components, depending on the desired implementation.

The image signal processor architecture 400 (e.g., an image signal processor (ISP)) may include an image sensor interface 402 that receives image data from the image sensor (e.g., as filtered using the CFA). For example, the image sensor interface 402 may be a mobile industry processor interface ("MIPI") such as MIPI D-PHY or MIPI C-PHY. MIPI D-PHY is a physical layer that includes a clock-forwarded synchronous link providing low noise and high jitter tolerance. MIPI D-PHY uses one clock lane and a variable number of data lanes to receive the image data from the image sensor. MIPI C-PHY, by contrast, uses an embedded clock that is embedded into the data lane. In various examples, the image sensor interface 402 may bridge a MIPI controller interface data to a streaming interface (e.g., an AXI streamlining interface) that writes data to AXI memory.

Buffer(s) 404 may comprise one or more circular buffers that may be used for streamlining to/from AXI (or other streaming protocols). In various examples, inbound data streams may be managed by circular buffer readers and outbound data streams may be managed by circular buffer writers. The buffer(s) 404 may use circular buffer management addresses/pointers to map an AXI stream either to or from linear AXI memory. This streamlining to/from circular buffers provides data storage/capture/replay capability in static random access memory (SRAM).

Configuration and status registers 406 may store various configuration data such as, for example, CFA index values, pixel color values associated with different CFA index values (e.g., in a table), per-CFA index offset values, gain values, etc. As described below, various components of the image signal processor architecture 400 may reference configuration and/or status data stored by configuration and status registers 406 during operation.

Image data may be received via image sensor interface 402 as an inbound pixel stream (IPS) comprising raw pixel values generated by the image sensor. Pixel tagger 408 may include circuitry (e.g., an ASIC) that tags the IPS data with metadata representing a coordinate (e.g., an X, Y coordinate) corresponding to the location of the pixel on the image sensor and/or the corresponding frame of image data. In addition, the pixel tagger 408 may tag the pixel with metadata representing an index position of the CFA. The X, Y coordinates may be used to lookup the pixel color (e.g., to represent the pixel as a red, green, blue, or infrared pixel based on the type of filter found at the index of the CFA). In some cases, metadata representing the pixel color (red, green, blue, or IR) may also be used by pixel tagger 408 to tag the inbound IPS data.

For example, pixel tagger 408 may use the frame width (in terms of a number of pixels) and height (in terms of a number of pixels) to tag the incoming raw pixel value (IPS data) with an X-Y position within the frame. The X, Y coordinates may be used to lookup a pixel color in a 16 entry table (e.g., corresponding to the color filters of the CFA) to label each pixel value with pixel color metadata. Similarly, each pixel value may be labeled with a CFA index (e.g., 0-15) that corresponds to the pixel value.

After tagging the pixel values using the pixel tagger 408 (as described above), the pixel values may be provided to black level adjustment component 410. Black level adjustment component 410 may include circuitry (e.g., an ASIC) effective to subtract a fixed direct current (DC) offset value from the input pixel values to adjust the black level of the image data. The particular DC offset value may be specific to each CFA index. Accordingly, the CFA index value metadata generated by pixel tagger 408 may be used by black level adjustment component 410 to determine the appropriate DC offset value to subtract for each pixel.

In various examples, the image signal processor architecture 400 may include a lens compensation component (not shown). A lens compensation component may be used to add a signed per-CFA index offset to compensate for veiling glare resulting from a lens of the camera generating the image data. Further, in some examples, a lens compensation component may apply a common multiplier (uniform gain) to all pixels to boost the signal. Further, in some examples, the lens compensation component (and/or a separate component) may perform defective pixel correction (DPC). DPC may evaluate each pixel's raw pixel value against an expected range of pixel values that is estimated using nearby pixels (e.g., adjacent pixels and/or pixels within a predefined distance from the subject pixel). If the pixel's raw pixel value is out of range the pixel may be deemed "defective" and the raw pixel value may be replaced by a pixel value that is estimated using nearby pixels of the same pixel color.

The pixel data may be sent to the lens shading component 412. In some examples, the lens shading component 412 may be combined with a lens compensation component. However, in other implementations, these components may be implemented using separate circuits and/or modules. Lens shading component 412 may compensate for lens and camera defects and/or tolerances, as well as lens edge transmission characteristics by applying a per-pixel color gain based on the X, Y position of the pixel in the frame. In various examples, the lens shading component 712 may lookup the per-pixel color gain using the X, Y position metadata of the pixel (added by pixel tagger 408) in a table stored in configuration and status registers 406. In various examples, the per-pixel color gain may also be determined using the metadata indicating the pixel's color. The gain may be multiplicatively applied to the pixel using a multiplier circuit of the lens shading component 412 in order to account for lens properties and manufacturing tolerances. In various implementations, the per-pixel color gain may be determined using the pixel's X, Y position metadata to identify a lens-shading cell of a grid. The corners of the cell may define the four corner grid points. Each corner grid point may be associated with a respective lens shading gain for the pixel's pixel color. The four lens shading gains may be interpolated to determine the gain to be applied to the pixel.

After lens shading component 412, the modified pixel data (e.g., the modified raw pixel values and the various metadata tagging each pixel described above) may be sent to CFA interpolation (CFAI) component 414. CFAI component 714 may perform CFA interpolation (demosaicing) to generate $I_{R,G,B,IR}$ image data for the current frame of image data so that each pixel is associated with a red pixel value, a green pixel value, a blue pixel value, and an infrared pixel value (in the case of an RGB(IR) image sensor).

As shown in FIG. 4, white balance component 418 and color correction component 420 may be implemented as a single component in hardware (e.g., as a single integrated circuit). White balance component 418 may apply a per-CFA index multiplier (e.g., determined using a lookup table for each CFA index) as a gain to each pixel value. In various examples, white balancing and/or gamma correction (e.g., performed by gamma correction component 422) may be implemented by the same component (e.g., ASIC) as the color correction component 420.

Red, green, and blue pixel values may be modified based on the infrared information using a 4×3 color correction matrix of color correction component 420. However, in some other implementations, the fully de-mosaiced image output by CFAI component 414 may have IR removed by an IR removal component (not shown in FIG. 4). Red, Green, Blue, and IR pixels have similar infrared responses in terms of spectral sensitivity. Accordingly, it is possible to use IR pixels as a reference to subtract off IR from the R, G, B pixels to remove IR information. Accordingly, an optional IR removal component may subtract the IR pixel values as a reference to remove infrared values from the image data.

In some cases, visible light pixels (R, G, B pixels) may be saturated when IR pixels are not saturated. In such a case, subtraction of an unsaturated IR value from a saturated R, G, B pixel may result in overcompensation which produces some unnatural results (e.g., dark skies and/or black suns in outdoor images). Accordingly, in various examples, the optional IR removal component may perform a 3×3 matrix multiplication on R, G, B color pixels if such pixels are unsaturated. If pixels (and particularly green pixels which have higher and broader spectral response) are saturated, the IR component may be corrected using a secondary clip operation. Optimal clip values may be determined using statistics gathered from prior frames by analyzing regions of green pixels that are saturated.

Color correction component 420 may be a circuit (e.g., a color correction circuit) effective to apply a color correction matrix (CCM) to the color planes to correct the color space. For example, if IR is first removed the CCM may be:

$$Pixel[R \quad B \quad G] = \begin{bmatrix} KR_R & KB_B & KG_G \\ KB_R & KB_B & KB_G \\ KG_R & KG_B & KG_G \end{bmatrix} \cdot \begin{bmatrix} R \\ B \\ G \end{bmatrix}$$

However, in other examples, IR information may be treated as another dimension of the image and not as a contaminant to the image. Such examples may not use an IR removal component, but may instead use a 4×3 matrix operation that takes 4 channels at input (R, G, B, and IR) and outputs 3 channels (R, G, B) eliminating the IR removal component. In such examples, the CCM may be a 4×3 matrix. Color correction component 420 may be implemented as a matrix multiplication circuit.

The CCM and white balance gains may be determined using statistics related to calibration of the image sensor. Such calibration statistics may include Auto-white balance statistics, auto-exposure statistics, and auto-focus statistics. Collectively, these statistics are often referred to as "3A statistics." The 3A statistics may be stored in memory (e.g., in configuration and status registers 406) and may be used to determine the white balance gains and/or the CCM. Accordingly, the 3A statistics may be provided at various points in the image signal processing pipeline prior to WB component 418 and color correction component 420, as shown in FIG. 4.

Gamma correction component 422 is used to correct for the differences between the way the image sensor captures information and the way that the human visual system processes light. In the image signal processor architecture 400 gamma correction may be performed using a lookup for each channel (e.g., R, G, and B) of each pixel to adjust the contrast of the image. Each color (R, G, B) may be associated with an independent gamma table that is used to lookup a gamma corrected value. In various examples, the lookup tables may be indexed by the pixel color value. The lookup tables may store the gamma corrected pixel values.

RGB to YUV component 424 may transform the RGB format data to the YUV format. In various examples, RGB to YUV component 424 may employ a 3×3 matrix multiplication followed by addition of an offset. For example:

$$Y = [R \quad B \quad G] \begin{bmatrix} Y_R \\ Y_G \\ Y_B \end{bmatrix} + Y_{offset};$$

$$U = [R \quad B \quad G] \begin{bmatrix} U_R \\ U_G \\ U_B \end{bmatrix} + U_{offset};$$

$$V = [R \quad B \quad G] \begin{bmatrix} V_R \\ V_G \\ V_B \end{bmatrix} + V_{offset}.$$

In various examples, the YUV format may require less bandwidth for transmission and/or storage.

Scaler 426 may be used to upscale or downscale the YUV (or RGB) data prior to converting the image data into a bit stream for writing to buffer(s) 404 (e.g., a circular buffer). In various examples, each of the luma (Y) and chroma (UV) channels may have separate configurations, to allow them to each be scaled independently. This may be important when converting from YUV444 to YUV420, as chroma is scaled to be ¼ the resolution (½ in each of the X, Y directions) of luma. Scaler 426 also provides cropping functionality such that the field of the output frame is a subset of the field of the input frame.

The scaler 426 first comprises a decimator followed by a filter. The decimator can be used to reduce the image size by 4:1, 3:1, 2:1, leave the image size unchanged, and/or change the image size by some other ratio, depending on the implementation. The image size may be changed independently in each of the horizontal (H) and vertical (V) directions.

In some examples, the decimator can be programmed to drop input pixels at the left, right, top, and bottom edges of the input image, providing for some cropping capability. Further cropping capability may be provided by the scaling function, with the added benefit of possibly more desirable edge interpolation, as the post-decimation image would not need to be edge extrapolated.

After the decimator stage, the input pixels define an annotated grid of locations, with columns (COLS) and rows (ROWS) (where COLS and ROWS is the post-decimator frame size). The scaler 426 uses the calibrated input grid and a set of configuration registers that are used to determine from where in the calibrated input grid each output pixel should be interpolated/extrapolated. The input pixels are defined to exist in the middle of each cell in the grid, thus the first input pixel is at 0.5, 0.5 in the defined grid.

To accomplish this, the scaler 746 uses, for each direction, a configured "initial" position value (Init) and position "increment" value (Incr) in order to specify where the output pixels are interpolated from within the input pixel frame grid. In the current example, Init=1 and Incr=2, so that the output pixels will have 2× the spacing of the input pixels, effectively a 2:1 downscale.

In each direction, the scaler 426 maintains a position register to indicate the position on the input grid from which to interpolate the output pixel. This position starts with the Init value, and is advanced by the amount of the Incr value after each output pixel is generated in that direction.

Thus, for the horizontal direction, output_pixel[0] is generated at grid position Init, output_pixel[1] is generated at grid position Init+Incr, . . . and output_pixel[N] is generated at grid position Init+N*Incr.

It should be noted that the RGB to YUV conversion by RGB to YUV component 424 and/or the up-scaling or down-scaling by scaler 426 may be optional operations that may not be performed in all cases. Output streams (e.g., frames of image data processing using the various components described above in reference to FIG. 4) may be sent to one or more buffers of the AXI (or other streaming protocol) memory.

Figure 5:
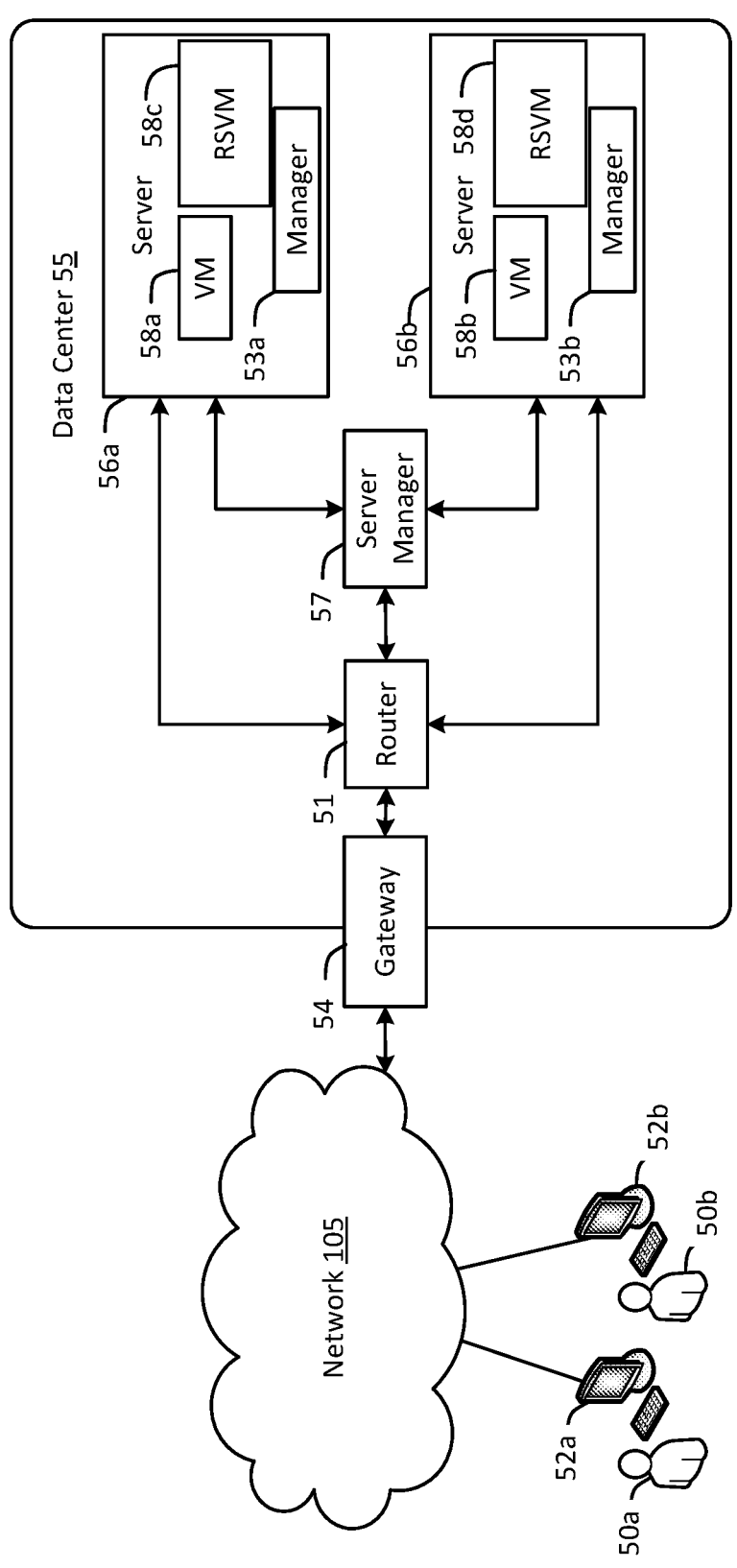
FIG. 5 is a diagram illustrating an example system for sending and providing data that may be used in accordance with the present disclosure.

An example system for sending and providing data will now be described in detail. In particular, FIG. 5 illustrates an example computing environment in which the embodiments described herein may be implemented. For example, the computing environment of FIG. 5 may be an example of a computing environment that may be used to send and receive snapshots and/or other image data using the wearable electronic security devices, described herein. FIG. 5 is a diagram schematically illustrating an example of a data center 55 that can provide computing resources to users 50a and 50b (which may be referred herein singularly as user 50 or in the plural as users 50) via user computers 52a and 52b (which may be referred herein singularly as user computer 52 or in the plural as user computers 52) via network 105. Data center 55 may be configured to provide computing resources for executing applications on a permanent or an as-needed basis. The computing resources provided by data center 55 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 55 may include servers 56a and 56b (which may be referred herein singularly as server 56 or in the plural as servers 56) that provide computing resources. These resources may be available as bare metal resources or as virtual machine instances 58a-d (which may be referred herein singularly as virtual machine instance 58 or in the plural as virtual machine instances 58). In at least some examples, server manager 57 may control operation of and/or maintain servers 56. Virtual machine instances 58c and 58d are rendition switching virtual machine ("RSVM") instances. The RSVM virtual machine instances 58c and 58d may be configured to perform all, or any portion, of the techniques for improved rendition switching and/or any other of the disclosed techniques in accordance with the present disclosure and described in detail above. As should be appreciated, while the particular example illustrated in FIG. 5 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 5, network 105 may, for example, be a publicly accessible network of linked networks and possibly operated by various distinct parties, such as the Internet. In other embodiments, network 105 may be a private network, such as a corporate or university network that is wholly or partially inaccessible to non-privileged users. In still other embodiments, network 105 may include one or more private networks with access to and/or from the Internet.

Network 105 may provide access to user computers 52. User computers 52 may be computers utilized by users 50 or other customers of data center 55. For instance, user computer 52a or 52b may be a server, a desktop or laptop personal computer, a tablet computer, a wireless telephone, a personal digital assistant (PDA), an e-book reader, a game console, a set-top box or any other computing device capable of accessing data center 55. User computer 52a or 52b may connect directly to the Internet (e.g., via a cable modem or a Digital Subscriber Line (DSL)). Although only two user computers 52a and 52b are depicted, it should be appreciated that there may be multiple user computers.

User computers 52 may also be utilized to configure aspects of the computing resources provided by data center 55. In this regard, data center 55 might provide a gateway or web interface through which aspects of its operation may be configured through the use of a web browser application program executing on user computer 52. Alternately, a stand-alone application program executing on user computer 52 might access an application programming interface (API) exposed by data center 55 for performing the configuration operations. Other mechanisms for configuring the operation of various web services available at data center 55 might also be utilized.

Servers 56 shown in FIG. 5 may be servers configured appropriately for providing the computing resources described above and may provide computing resources for executing one or more web services and/or applications. In one embodiment, the computing resources may be virtual machine instances 58. In the example of virtual machine instances, each of the servers 56 may be configured to execute an instance manager 53a or 53b (which may be referred herein singularly as instance manager 53 or in the plural as instance managers 53) capable of executing the virtual machine instances 58. The instance managers 53 may be a virtual machine monitor (VMM) or another type of program configured to enable the execution of virtual machine instances 58 on server 56, for example. As discussed above, each of the virtual machine instances 58 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 55 shown in FIG. 5, a router 51 may be utilized to interconnect the servers 56a and 56b. Router 51 may also be connected to gateway 54, which is connected to network 105. Router 51 may be connected to one or more load balancers, and alone or in combination may manage communications within networks in data center 55, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 55 shown in FIG. 5, a data center 55 is also employed to at least in part direct various communications to, from and/or between servers 56a and 56b. While FIG. 5 depicts router 51 positioned between gateway 54 and data center 55, this is merely an exemplary configuration. In some cases, for example, data center 55 may be positioned between gateway 54 and router 51. Data center 55 may, in some cases, examine portions of incoming communications from user computers 52 to determine one or more appropriate servers 56 to receive and/or process the incoming communications. Data center 55 may determine appropriate servers to receive and/or process the incoming communications based on factors such as an identity, location or other attributes associated with user computers 52, a nature of a task with which the communications are associated, a priority of a task with which the communications are associated, a duration of a task with which the communications are associated, a size and/or estimated resource usage of a task with which the communications are associated and many other factors. Data center 55 may, for example, collect or otherwise have access to state information and other information associated with various tasks in order to, for example, assist in managing communications and other operations associated with such tasks.

It should be appreciated that the network topology illustrated in FIG. 5 has been greatly simplified and that many more networks and networking devices may be utilized to interconnect the various computing systems disclosed herein. These network topologies and devices should be apparent to those skilled in the art.

It should also be appreciated that data center 55 described in FIG. 5 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

FIG. 6 illustrates another example architecture of electronic device 120 (e.g., a camera device and/or other wearable electronic security devices described herein) that may be configured to perform in accordance with the various techniques described herein. Although a variety of components are shown in the example implementation of electronic device 120 shown in FIG. 6, it should be noted that an instantiation of electronic device 120 may include a different set of components (including fewer or additional components relative to what is shown in FIG. 6). As shown, the electronic device 120 may include one or more processors 603, one or more network interfaces 604, one or more accelerometers 114 (and/or gyroscopes and/or magnetometers), one or more imaging devices 608, one or more lighting devices 612, one or more input devices 614, one or more power sources 616, one or more speakers 618, one or more microphones 620, and memory 622.

An imaging device 608 (e.g., camera 154) may include any device that includes an image sensor 644, such as a charge-coupled device (CCD) and/or an active-pixel sensor (CMOS sensor), that is capable of generating image data 626 (which may represent, and/or include, the frames of image data described herein), representing one or more images (e.g., a video). The imaging device 608 may include a lens 638 that is effective to focus light on the image sensor 644. As previously described, the light may be filtered by an RGB CFA 640 (e.g., a Bayer CFA) or an RGB-IR CFA. In one aspect of the present disclosure, the image sensor 644 may comprise a complementary metal-oxide semiconductor (CMOS) array and may be capable of recording high definition (e.g., 722p, 1080p, 4K, 8K, etc.) image and/or video files. The image sensor 644 may comprise a plurality of photosensors that may transform light into electrical signals. Such electrical signals may be represented by numerical values (e.g., floating point numbers) that may be processed using the image signal processor architecture 400. Each photosensor of the image sensor 644 corresponds to a pixel in a frame of image data captured by the image sensor. In other words, the light information captured by the image sensor is represented as pixel values (e.g., a respective pixel value captured by each photosensor/pixel of the image sensor). Accordingly, each pixel in a frame of image data typically corresponds to one photosensor and the pixels in a frame are likewise arranged in a grid. The pixel value of each pixel represents the light captured by the corresponding photosensor during image capture. As previously described intensity values for each pixel may be used in one or more of the ISP-based motion detection techniques described herein. Intensity values may be Laplacian edge values and/or may be the input pixel value multiplied by the color channel gain for the color channel of the pixel (e.g., R, G, B, or IR).

In some other examples, the image sensor may be coated with a dual band-pass filter that has a passband at about 900 nm to allow IR color reproduction during the day and also to allow IR light detection when the imaging device(s) 608 are in night mode.

The imaging device 608 may include a separate image signal processor architecture 400 (e.g., as described in FIG. 4), or the processor(s) 603 may perform the camera processing functionality. The processor(s) 603 (and/or camera processor) may include an encoding and compression chip. In some embodiments, the processor(s) 603 (and/or the camera processor) may comprise a bridge processor. The processor(s) 603 (and/or the camera processor) may process video recorded by the image sensor and may transform this data into a form suitable for transfer by the network interface(s) 604. In various examples, the imaging device 608 also includes memory, such as volatile memory that may be used when data is being buffered or encoded by the processor(s) 603 (and/or the camera processor). For example, in certain embodiments the camera memory may comprise synchronous dynamic random-access memory (SD RAM).

The lighting device(s) 612 may be one or more light-emitting diodes capable of producing visible light and/or infrared light when supplied with power (e.g., to enable night vision). In some embodiments, when activated, the lighting device(s) 612 illuminates a light pipe. In some examples, the electronic device 120 uses the lighting device(s) 612 to illuminate specific components of the electronic device 120, such as the input device(s) 614. This way, users are able to easily see the components when proximate to the electronic device 120.

An input device 614 may include, but is not limited to, a button, a touch-sensitive surface, a switch, a slider, and/or any other type of device that allows a user to provide input to the electronic device 120. For example, user button 108 may be an example of an input device 614. In some examples, based on receiving an input, the processor(s) 603 may receive a signal from the input device 614 and use the signal to determine that the input device 614 received the input. Additionally, the processor(s) 603 may generate input data representing the input received by the input device(s) 614. For example, the input data may represent the type of input (e.g., a push to a button, a long press, a short press, a triple press, etc.), a time that the input occurred, and/or the like.

The power source(s) 616 may include one or more batteries that provide power to the electronic device 120. However, in other examples, the electronic device 120 may not include the power source(s) 616. In such examples, the electronic device 120 may be powered using a source of external AC (alternating-current) power, such as a household AC power supply (alternatively referred to herein as "AC mains" or "wall power"). The AC power may have a voltage in the range of 112-220 VAC, for example. The incoming AC power may be received by an AC/DC adapter (not shown), which may convert the incoming AC power to DC (direct-current) and may step down the voltage from 112-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

The speaker(s) 618 may be any electromechanical device capable of producing sound in response to an electrical signal input. The microphone(s) 620 may be an acoustic-to-electric transducer or sensor capable of converting sound waves into audio data 630 representing the sound. The speaker(s) 618 and/or microphone(s) 620 may be coupled to an audio CODEC to enable digital audio received by user devices to be decompressed and output by the speaker(s) 618 and/or to enable audio data captured by the microphone(s) 620 to be compressed into digital audio data 630. In some examples, the electronic device 120 includes the speaker(s) 618 and/or the microphone(s) 620 so that the user associated with the electronic device 120 can communicate with one or more other users located proximate to the electronic device 120. For example, the microphone(s) 620 may be used to generate audio data representing the speech of the one or more other users, which is then sent to the camera device. Additionally, the speaker(s) 618 may be configured to output user speech of the user, where the user's user speech may also be represented by audio data 630.

As further illustrated in the example of FIG. 6, the electronic device 120 may include the computer-vision component 648. The computer-vision component 648 may be configured to analyze the image data 626 using one or more computer-vision techniques and output computer-vision data 650 based on the analysis. The computer-vision data 650 may represent information, such as the presence of an object represented by the image data 626, the type of object represented by the image data 626, locations of the object relative to the electronic device 120, a direction of movement of the object, a velocity of the object, and/or any other type of information. As described herein, the type of object may include, but is not limited to, a person, a human face, an animal (e.g., a dog, a cat, a bird, etc.), a car, a tree, a wall, and/or any other type of object. In some examples, the computer-vision data 650 may further represent a bounding box indicating the respective location of each object represented by the image data 626.

For example, the computer-vision component 648 may analyze the image data 626 using one or more computer-vision techniques such as, but not limited to, object detection technique(s), object tracking technique(s), semantic segmentation technique(s), instance segmentation technique(s), object co-segmentation techniques, and/or any other computer vision technique(s). Computer-vision analysis includes methods for acquiring, processing, analyzing, and understanding digital images, such as by extracting high-dimensional data from the real world in order to produce numerical or symbolic information. This information is then used to identify object(s) represented in the image, locations of the object(s), a respective velocity of each object, and/or the like.

For a first example of performing computer-vision analysis, the computer-vision component 648 may use image segmentation technique(s) that use the computer-vision analysis to locate objects and boundaries (e.g., lines, curves, etc.) in images. Image segmentation may further assign labels to the segments, where segments that include the same label also include the same characteristics. As described herein, the one or more image segmentation techniques may include, but are not limited to, clustering technique(s), compression-based technique(s), histogram-based technique(s), edge detection technique(s), dual clustering technique(s), multi-scale segmentation technique(s), and/or any other type of image segmentation technique that may be use to segment the frame(s) of the video. In various examples, computer vision component 648 may be used to evaluate the contents of rolling buffer 156, as previously described.

Compression-based technique(s) attempts to find patterns in an image and any regularity in the image can then be compressed. The compression-based technique(s) describe each segment (e.g., portion) by its texture and boundary shape, where each component is modeled by a probability distribution function and its coding length. The goal of the compression-based technique(s) is to find the segmentation which produces the shortest coding length. This may be achieved by a simple agglomerative clustering method.

Histogram-based technique(s) compute a histogram from all of the pixels in the image, where the peaks and values in the histogram are used to locate the clusters (e.g., portions) in the image. In some instances, color and intensity can be used as the measure of the clusters. In some instances, the histogram-based technique(s) may recursively apply the histogram-seeking method to clusters in the image in order to divide the clusters into smaller clusters. This operation may be repeated until no more clusters are formed.

Edge detection technique(s) use region boundaries and edges that are closely related, since there is often a sharp adjustment in intensity at the region boundaries. As such, the edge detection technique(s) use the region boundaries to segment an image. In some instances, the edge detection technique(s) use image detectors to identify the region boundaries.

Dual clustering technique(s) uses a combination of three characteristics of an image: partition of the image based on histogram analysis is checked by high compactness of the clusters, and high gradients of their borders. The dual clustering technique(s) use two spaces, one space is a one-dimensional histogram of brightness and a second space is a dual three-dimensional space of the original image. The first space allows the dual clustering technique(s) to measure how compactly the brightness of the image is distributed by calculating a minimal clustering. The clustering technique(s) use the two spaces to identify objects within the image and segment the image using the objects.

For a second example of performing computer-vision analysis, the computer-vision component 648 may use object detection technique(s) that use computer-vision analysis to perform informative region selection, features extraction, and then classification of object(s) represented by the image data 626. Informative region selection may include selecting different portions (e.g., windows) of an image represented by the image data for analysis. Feature extraction may then include extracting visual features of the object(s) located within the portions of the image in order to provide a semantic and robust representation of the object(s). Finally, classification may include classifying the type(s) of object(s) based on the extracted features for the object(s). In some examples, the object detection technique(s) may include machine learning technique(s), such as a Viola-Jones object detection technique, a scale-invariant feature transform technique, a histogram of oriented gradients features technique, and/or the like. Additionally, and/or alternatively, in some examples, the object detection technique(s) may include deep learning approaches, such as vision transformer-based approaches, region proposal technique(s) (e.g., CNN technique(s),), you only look once technique(s), deformable convolutional networks technique(s), ad/or the like.

The electronic device 120 may also store command data 656. In some circumstances, a user of the electronic device 120 may want to receive a live view from the electronic device 120. The command data 656 may represent an identifier associated with the electronic device 120, a command to generate the image data 626, a command to send the image data 626, and/or the like. In some examples, the electronic device 120 may then analyze the command data 656 and, based on the identifier, determine that the command data 656 is directed to the electronic device 120. For example, the electronic device 120 may match the identifier represented by the command data 656 to an identifier associated with, and stored by, the electronic device 120. Additionally, the electronic device 120 may cause the imaging device(s) 608 to begin generating the image data 626 (e.g., if the imaging device(s) 608 are not already generating the image data 626) and send the image data 626 (or snapshots) to the one or more computing devices implementing the ISP-based motion detector 102, the camera device, and/or another device.

As used herein, a processor may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the network interface(s), the I/O devices of the respective apparatuses, and so forth, and provide various services to applications or components executing on the processor(s). Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network interface(s) may enable data to be communicated between electronic devices. The network interface(s) may include one or more network interface controllers (NICs) or other types of transceiver devices to send and receive messages over network(s). For instance, the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, the network interface(s) may include a wide area network (WAN) component to enable message over a wide area network.

As noted above, in accordance with one or more implementations, an electronic device may include a plurality of different processors capable of operating at different power levels.

In accordance with one or more implementations, an electronic device includes a first SoC comprising one or more processors (e.g. a Bluetooth Low Energy SoC) that is configured to use one or more machine learning models to process accelerometer data and determine whether accelerometer data corresponds to human movement, e.g. to walking or running. The first SoC comprises instructions operable to effect transitioning, based on such a determination, from an idle mode to a pre-roll mode and powering up of a second SoC comprising one or more processors (e.g. a pre-roll SoC) that is configured to use one or more machine learning models to process pre-roll video data and determine whether an object (e.g. a person or animal) or activity has been detected. The second SoC comprises instructions operable to effect transitioning, based on such a determination, from the pre-roll mode to a continuous-recording mode and powering up of a third SoC comprising one or more processors (e.g. a media SoC or Wifi SoC). The first, second, and/or third SoC may also be configured to periodically determine in the pre-roll or continuous recording modes whether accelerometer data corresponds to human movement, and, upon a configured amount of time passing without having determined that accelerometer data corresponds to human movement, effect powering down of the camera and the second and third SoCs. Each of these SoCs may include its own set of one or more computer readable media, which may contain processor executable instructions executable by one or more processors of that SoC.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. An electronic device comprising:
an accelerometer;
a camera;
one or more processors; and
one or more computer-readable media storing computer executable instructions that, when executed by the one or more processors, cause the one or more processors to perform operations comprising:
determining, using a first classifier and first accelerometer data generated by the accelerometer, that the first accelerometer data corresponds to human movement; and
controlling the electronic device to capture video and store the video in a rolling buffer in a first operation mode based on the determining that the first accelerometer data corresponds to human movement.

2. The electronic device of claim 1, the one or more computer-readable media storing instructions that, when executed by the one or more processors, cause the one or more processors to perform operations comprising:
determining, using the first classifier and second accelerometer data generated by the accelerometer, that the second accelerometer data does not correspond to human movement; and
controlling the electronic device to operate in an idle mode based on the determining that the second accelerometer data does not correspond to human movement, wherein the camera does not capture or store video while the electronic device is in idle mode.

3. The electronic device of claim 1, the one or more computer-readable media storing instructions that, when executed by the one or more processors, cause the one or more processors to perform operations comprising:
detecting, using a second classifier, a first object of interest in the video captured during the first operation mode; and
controlling the electronic device to operate in a second operation mode based on the detecting the first object of interest in the video captured during operation of the electronic device in the first operation mode, wherein the camera continuously captures video and stores the continuously captured video in the one or more computer-readable media during the operation of the electronic device in the second operation mode.

4. The electronic device of claim 3, the one or more computer-readable media storing instructions that, when executed by the one or more processors, cause the one or more processors to perform operations comprising:
generating a first frame of image data representing at least a portion of the first object of interest; and
sending the first frame of image data to at least one a first computing device using a low power wireless transmission protocol.

5. The electronic device of claim 3, further comprising a microphone, wherein the one or more computer-readable media store instructions that, when executed by the one or more processors, cause the one or more processors to perform operations comprising:
capturing first audio data in the second operation mode and storing the first audio data in association with the continuously captured video in the one or more computer-readable media during the second operation mode;
generating a first audio sample associated with a time at which the first object of interest was detected in the video; and
sending the first audio sample to at least a first computing device.

6. The electronic device of claim 3, further comprising a button, wherein the one or more computer-readable media store instructions that, when executed by the one or more processors, cause the one or more processors to perform operations comprising:
detecting at least one press of the button; and
controlling the electronic device to operate in a third operation mode based on the at least one press of the button, wherein operation in the third operation mode causing the electronic device to emit a flashing light and an alarm sound.

7. The electronic device of claim 1, the one or more computer-readable media storing instructions that, when executed by the one or more processors, cause the one or more processors to perform operations comprising:
determining a first amount of time since accelerometer data from the accelerometer has indicated human movement;
determining that the first amount of time is greater than or equal to a threshold amount of time; and
controlling the electronic device to operate in an idle mode based on the first amount of time being greater than or equal to the threshold amount of time, wherein the camera does not capture or store video while the electronic device is in idle mode.

8. The electronic device of claim 1, the one or more computer-readable media storing a first code and instructions that, when executed by the one or more processors, cause the one or more processors to perform operations comprising:
broadcasting the first code by at least a first transmitter of the electronic device, wherein the first code is effective to cause a first lock of a network-enabled device to be actuated.

9. The electronic device of claim 1, wherein the electronic device is a battery-powered electronic device having a form factor configured to couple to an article of clothing.

10. The electronic device of claim 1, further comprising a light emitting diode (LED), wherein the LED is configured to emit a flashing light during operation of the electronic device in the first operation mode.

11. The electronic device of claim 1, further comprising a microphone, wherein the one or more computer-readable media store instructions that, when executed by the one or more processors, cause the one or more processors to perform operations comprising:
detecting, using a second classifier, a first audio event captured by the microphone during operation of the electronic device in the first operation mode; and
controlling the electronic device to operate in a second operation mode based on the detecting the first audio event during operation of the electronic device in the first operation mode, wherein the camera continuously captures video and stores the continuously captured video in the one or more computer-readable media during the second operation mode.

12. The electronic device of claim 1, the one or more computer-readable media storing instructions that, when executed by the one or more processors, cause the one or more processors to perform operations comprising:

detecting, using a second classifier, a first object of interest in the video captured during the first operation mode;

controlling the electronic device to operate in a second operation mode based on the detecting the first object of interest in the video captured during operation of the electronic device in the first operation mode, wherein the camera continuously captures video and stores the continuously captured video in the one or more computer-readable media during the second operation mode; and sending an alert to at least one other device in response to transition of the electronic device from the first operation mode to the second operation mode.

13. The electronic device of claim 1, the one or more computer-readable media storing instructions that, when executed by the one or more processors, cause the one or more processors to perform operations comprising:

controlling the electronic device to operate in a second operation mode based on an event detected during operation of the electronic device in in the first operation mode, wherein video captured by the camera during the first operation mode is at a first resolution and video captured by the camera during the second operation mode is at a second resolution, wherein the second resolution is higher than the first resolution.

14. The electronic device of claim 1, wherein the first classifier comprises a first machine learning model.

15. An electronic device comprising:

an accelerometer;

a microphone;

one or more processors; and one or more computer-readable media storing computer executable instructions that, when executed by the one or more processors, cause the one or more processors to perform operations comprising:

determining, using a first classifier and first accelerometer data generated by the accelerometer, that the first accelerometer data corresponds to human movement; and controlling the electronic device to capture audio data in a rolling buffer in a first operation mode based on the determining that the first accelerometer data corresponds to human movement.

16. The electronic device of claim 15, the one or more computer-readable media storing further instructions that, when executed by the one or more processors, cause the one or more processors to perform further operations comprising:

determining, using the first classifier and second accelerometer data generated by the accelerometer, that the second accelerometer data does not correspond to human movement; and controlling the electronic device to operate in an idle mode based on the determining that the second accelerometer data does not correspond to human movement, wherein the electronic device does not store audio data while the electronic device is in idle mode.

17. The electronic device of claim 15, the one or more computer-readable media storing further instructions that, when executed by the one or more processors, cause the one or more processors to perform further operations comprising:

detecting, using a machine learning model, a first event detected in the audio data captured during operation of the electronic device in the first operation mode; and controlling the electronic device to operate in a second operation mode based on the detecting the first event in the audio data captured during operation of the electronic device in the first operation mode, wherein the electronic device continuously stores audio data in the one or more computer-readable media during operation of the electronic device in the second operation mode.

18. The electronic device of claim 17, further comprising a camera, wherein the one or more computer-readable media store further instructions that, when executed by the one or more processors, cause the one or more processors to perform further operations comprising:

controlling the camera to continuously capture video and store the continuously captured video in the one or more computer-readable media during operation of the electronic device in the second operation mode.

19. An electronic device comprising:

an accelerometer;

a camera;

a first set of one or more processors;

a second set of one or more processors; and one or more computer-readable media storing computer executable instructions that, when executed by the first set of one or more processors, cause the first set of one or more processors to perform operations comprising:

determining, using a first machine learning model, that first accelerometer data generated by the accelerometer corresponds to human movement, and based on a first amount of time having elapsed since the determining that the first accelerometer data corresponds to human movement, transitioning the electronic device to an idle mode, wherein video data is not captured by the electronic device while in the idle mode.

20. The electronic device of claim 19, wherein the one or more computer-readable media store computer executable instructions that, when executed by the first set of one or more processors, cause the first set of one or more processors to perform operations comprising:

based on the determining that the first accelerometer data corresponds to human movement, effecting powering up of the camera and the second set of one or more processors.

21. The electronic device of claim 19, wherein the one or more computer-readable media store computer executable instructions that, when executed by the first set of one or more processors, cause the first set of one or more processors to perform operations comprising:

determining, using the first machine learning model, that second accelerometer data generated by the accelerometer corresponds to human movement, and based on the determining that the second accelerometer data corresponds to human movement, effecting powering up of the camera and the second set of one or more processors.

* * * * *